United States Patent
Netanel et al.

(10) Patent No.: US 11,750,705 B2
(45) Date of Patent: Sep. 5, 2023

(54) METHOD AND SYSTEM FOR ENHANCED IOT DEVICE COMMUNICATIONS

(71) Applicant: Aeris Communications, Inc., San Jose, CA (US)

(72) Inventors: Eran Netanel, Belmont, CA (US); Syed Zaeem Hosain, San Jose, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 16/701,781

(22) Filed: Dec. 3, 2019

(65) Prior Publication Data
US 2020/0177680 A1 Jun. 4, 2020

Related U.S. Application Data

(60) Provisional application No. 62/774,948, filed on Dec. 4, 2018.

(51) Int. Cl.
*H04L 67/145* (2022.01)
*H04L 69/163* (2022.01)
(Continued)

(52) U.S. Cl.
CPC ............ *H04L 67/145* (2013.01); *H04L 47/28* (2013.01); *H04L 47/72* (2013.01); *H04L 47/826* (2013.01);
(Continued)

(58) Field of Classification Search
CPC ..... H04L 67/145; H04L 69/163; H04L 47/28; H04L 47/826; H04L 47/72; H04W 28/12; H04W 76/25; H04W 4/46; H04W 4/70
See application file for complete search history.

(56) References Cited

U.S. PATENT DOCUMENTS 6,058,289 A 5/2000 Gardner
6,484,082 B1 11/2002 Millsap
(Continued)

FOREIGN PATENT DOCUMENTS

WO 2019127327 7/2019

OTHER PUBLICATIONS

Siegel, CloudThink and the Avacar: Embedded Design to Create Virtual Vehicles for Cloud-Based Informatics, Telematics, and Infotainment; Jun. 2013, Retrieved from the Internet: https://dspace.mit.edu/bitstream/handle/1721.1/92230/897472909-MIT.pdf?sequence=2.

(Continued)

*Primary Examiner* — Charles C Jiang
*Assistant Examiner* — Shawn D Miller
(74) *Attorney, Agent, or Firm* — Shih IP Law Group, PLLC

(57) ABSTRACT

A computer-implemented method and system for reducing time lag in data transfer are disclosed. The computer implemented method for reducing time lag in data transfer, the method includes sending a small packet of data at predetermined time from at least one device to a destination address to keep the network connection alive and network resources assigned, wherein the at least one device includes one or more of: a transmitting device, a receiving device or a combination thereof. The system for reducing time lag in data transfer, the system comprising at least one base station; at least one device, wherein the at least one device includes one or more of a transmitting device, a receiving device or a combination thereof; wherein the at least device sends a small packet of data at predetermined time to a destination address to keep the network connection alive and network resources assigned.

21 Claims, 10 Drawing Sheets

(51) Int. Cl.
*H04L 47/28* (2022.01)
*H04W 28/12* (2009.01)
*H04L 47/70* (2022.01)
*H04W 76/25* (2018.01)
*H04L 47/72* (2022.01)

(52) U.S. Cl.
CPC ........... *H04L 69/163* (2013.01); *H04W 28/12* (2013.01); *H04W 76/25* (2018.02)

(56) References Cited

U.S. PATENT DOCUMENTS

| | | | |
|---|---|---|---|
| 7,774,007 | B2 | 8/2010 | Backholm |
| 9,161,309 | B2 | 10/2015 | Nirantar |
| 9,661,080 | B2 | 5/2017 | Haleem |
| 9,923,996 | B1 | 3/2018 | Morris |
| 10,230,777 | B2 | 3/2019 | Patel |
| 10,356,223 | B1 | 7/2019 | Kuo |
| 2007/0019610 | A1 | 1/2007 | Backholm et al. |
| 2012/0231747 | A1* | 9/2012 | Chen ................. H04W 52/0258 455/68 |
| 2014/0051454 | A1 | 2/2014 | Wirtanen et al. |
| 2014/0157009 | A1 | 6/2014 | Kherani |
| 2015/0009990 | A1* | 1/2015 | Sung ................... H04L 12/4633 370/392 |
| 2015/0255053 | A1* | 9/2015 | Nelson ................ G10H 1/0083 84/645 |
| 2017/0164165 | A1* | 6/2017 | Negalaguli ......... H04W 12/033 |
| 2018/0027412 | A1* | 1/2018 | Mandapaka ........ H04L 63/0869 713/151 |
| 2019/0208538 | A1 | 7/2019 | Lee |
| 2019/0386880 | A1* | 12/2019 | Dhanabalan ........ H04L 61/2571 |
| 2020/0146097 | A1* | 5/2020 | Haartsen ........... H04W 52/0274 |

OTHER PUBLICATIONS

International Search Report and Written Opinion from International Application No. PCT/US2019/064194 dated Apr. 2, 2020.

* cited by examiner

METHOD AND SYSTEM FOR ENHANCED IOT DEVICE COMMUNICATIONS

CROSS-REFERENCE TO RELATED APPLICATION

This application claims priority to U.S. Provisional Application No. 62/774,948, filed Dec. 4, 2018, entitled "METHOD AND SYSTEM FOR ENHANCED IoT DEVICE COMMUNICATIONS" which is incorporated herein by reference in its entirety.

FIELD OF THE INVENTION

The present invention relates generally to cellular or other wireless networks and more particularly to mobile devices capable of sending data to IoT devices capable of receiving data via cellular or other wireless network.

BACKGROUND

Many Internet-of-Things (IoT)/Machine-to-Machine (M2M) devices receive commands remotely from mobile devices such as mobile phones or other IoT devices such as vehicles capable of sending data via cellular or other wireless network. An enhanced IoT device communications method and system reduces lag time needed to wake up the target device to receive data from a source device by informing the target device of pending or anticipated data transfer.

SUMMARY

In one or more embodiments, a computer-implemented method, system and computer program product for reducing time lag in data transfer are disclosed.

The computer implemented method for reducing time lag in data transfer, the method includes sending a small packet of data at predetermined time from at least one device to a destination address to keep the network connection alive and network resources assigned, wherein the at least one device includes one or more of a transmitting device, a receiving device or a combination thereof.

The system for reducing time lag in data transfer, the system comprising at least one base station; at least one device, wherein the at least one device includes one or more of a transmitting device, a receiving device or a combination thereof; wherein the at least one device sends a small packet of data at predetermined time to a destination address to keep the network connection alive and network resources assigned.

The computer program product stored on a non-transitory computer readable medium for reducing time lag in data transfer; the computer program product includes a processor, and a memory in communication with the processor wherein the memory containing program instructions which when executed by the processor, perform the following operations including sending a small packet of data at predetermined time from at least one device to a destination address to keep the network connection alive and network resources assigned, wherein the at least one device includes one or more of a transmitting device, a receiving device or a combination thereof.

DETAILED DESCRIPTION

Figure 1A:
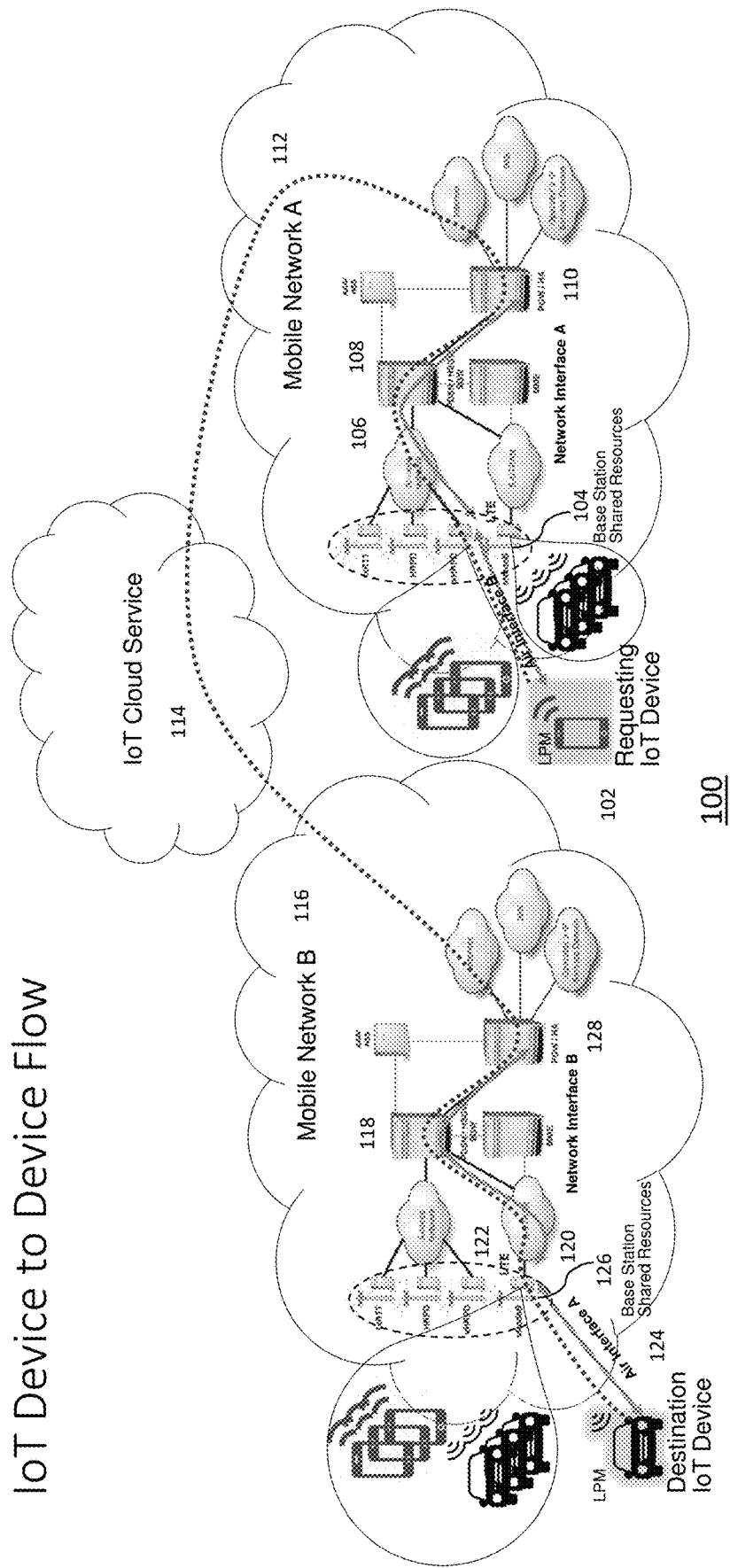
FIG. 1A illustrates a system 100 used for IoT device to device data flow.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present invention relates generally to cellular or other wireless networks and more particularly to mobile devices capable of sending data to IoT devices capable of receiving data via cellular or other wireless network.

Many Internet-of-Things (IoT)/Machine-to-Machine (M2M) devices receive commands remotely from mobile devices such as mobile phones capable of sending data to these IoT devices via cellular or other wireless network. The embodiments described herein for an enhanced IoT device communications method and system may reduce lag time needed for a target device to receive data from a source device. This reduction in time lag may be achieved by one or more of the following methods: 1. a network source informing the target device of anticipated and/or pending data transfer and the target device sending a small packet of data to a base station or some destination address to keep the network connection alive and resources assigned to the target device, 2. sending a small packet of data to a base station or some destination address from a source device to keep the network connection alive and resources assigned to the source device before sending data to the network. The small packets of data may be sent by the destination device or the source device in response to a command from the network or by the devices on their own as a result of programming instructions or applications installed in the device which may be based on machine learning, e.g., known time/day for receiving commands based on device usage analytics etc., and the destination for the data packet may be some IP address on the internet which may or may not be a real address. The person skilled in the art may readily understand that the reduction in time lag may be achieved by either the target device (receiving device) or the source device (transmitting device) sending small packets of data thereby keeping the network connection alive and network resources assigned to the device for data transfer, or both the target device (receiving device) and the source device (transmitting device) sending small packets of data thereby keeping the network connection alive and network resources assigned to both the devices for data transfer.

The data size for the small packet of data may be pre-configured by the transmitting device or alternatively provided by the warmup command. The small packet data size may vary depending on network resource requirement for the pending data transfer and can be as small as zero payload (for example a ping with zero bytes), accompanied by a data frame header (or an IP header) which may be enough for the base station to consider as data and maintain at least minimal resources. However, more frequent data transmission and/or larger data size (for example ping of 64 KB) may be configured if the application intends that the base station reserves larger number of resources for the anticipated data transfer.

One such example of IoT devices is connected vehicles, which are capable of receiving and executing the data from mobile phones or other IoT devices capable of sending those data via a cellular or wireless network. One of the features in connected vehicle solution is the ability to perform operations remotely like Door Lock/Unlock, Engine Start, Honk and Flash etc. The embodiments described herein provide a method to reduce the time between sending data from a source device to a target device by informing the target device (or devices) of anticipated and/or pending data transfer. Such information may be used by the target device(s) to establish and keep data channel wireless resources assigned to it for a short period enough for the delivery of the data to be transferred in the shortest amount of time by sending a small packet of data to the base station, a technique which may be referred to as data warmup, eliminating wakeup times and/or resource scheduling and queuing.

The data warm-up technique could be used in multiple use cases and for either or both the devices, e.g., target device and a source device. For example: 1. Responsive mobile to vehicle commands such as Door Lock, Door Unlock, Honk, Flash and Engine Start where vehicle owners are expecting experience similar to Key Fob, which is almost real-time or near real-time; 2. Vehicle to vehicle communication through a mobile network where vehicles approaching an intersection can warmup and be able to receive updates from other approaching vehicles eliminating unnecessary and dangerous data delays.

Figure 2A:
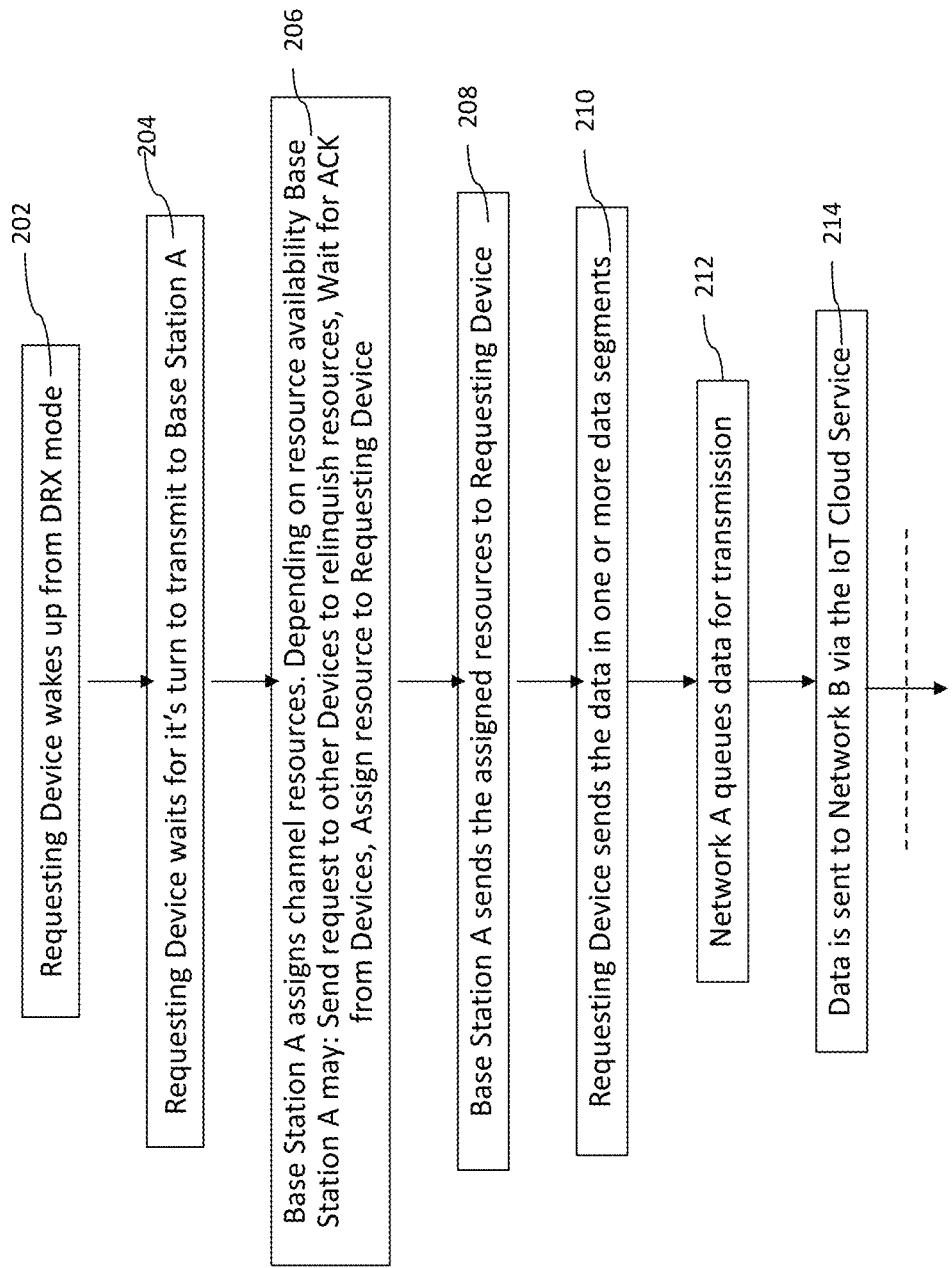
FIGS. 2A and 2B illustrate a process used for typical IoT device to device data flow.

FIG. 1A illustrates a system 100 used device to device data flow for IoT devices. The system 100 used for device to device data flow for IoT devices includes a requesting device (transmitting device) 102, a receiving device 104, one or more networks, e.g., Network A 112 and network B 116, each with its own base station, e.g., base station 104 and base station 126 and a cloud service 114. The base stations as illustrated may be for 3G technology, e.g., HRPD, eHRPD, or 4G technology, e.g., eNodeB shown for LTE. For example, the requesting device (transmitting device), Device A 102, a receiving device, Device B 104, may use 3G or 4G or other technology based on their capabilities and availability. A base station may be defined as a system that manages local area radio frequency (RF) connection to the surrounding mobile devices. Depending on the technology it may be just the towers or a collection of the tower and some systems in a local back office nearby. FIGS. 2A and B illustrate the process involved in a typical device to device data flow for IoT devices using system 100 illustrated in FIG. 1A.

Figure 1B:
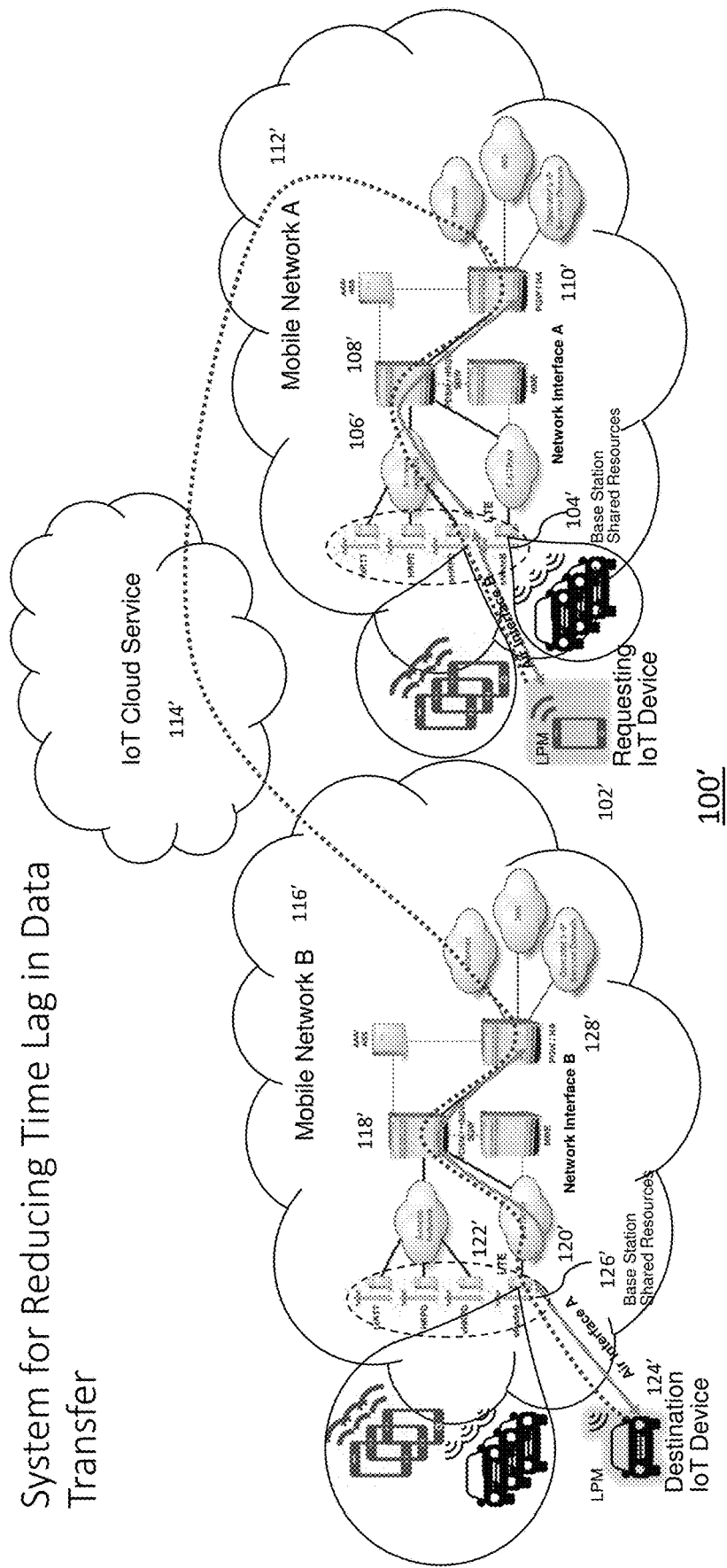
FIG. 1B illustrates a system 100' used for reducing time lag in data transfer according to an embodiment described herein.
Figure 3:
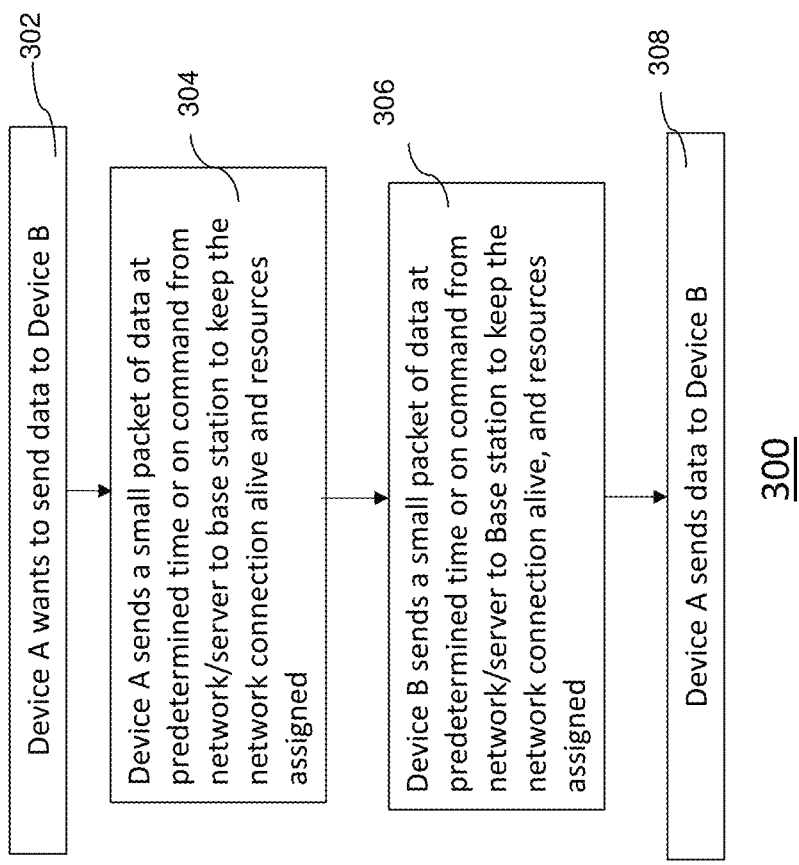
FIG. 3 illustrates an exemplary process flow for reducing time lag in data transfer according to an embodiment described herein.

FIG. 1B illustrates a system 100' used for carrying out a method for reducing time lag in data transfer according to an embodiment described herein. The method for reducing time needed to wake up a target device to receive data from a source device by informing the target device of anticipated and/or pending data transfer and thereby reducing time lag in data transfer is illustrated in FIG. 3. The system 100' used for device to device data flow for IoT devices includes a requesting device (transmitting device), Device A 102', a receiving device, Device B 104', one or more networks, e.g., network A 112' and network B 116' (which could be same as network A 112' or different from network A 112'), each with its own base station, e.g., base station A104' and base station B 126' and a cloud service 114'. The base stations as illustrated may be for 3G technology, e.g., HRPD, eHRPD, or 4G technology, e.g., eNodeB shown for LTE. For example, the requesting device (transmitting device), Device A 102', a receiving device, Device B 104', may use 3G or 4G or other technology based on their capabilities and availability. A base station may be defined as a system that manages local area radio frequency (RF) connection to the surrounding mobile devices. Depending on the technology it may be just the towers or a collection of the tower and some systems in a local back office nearby.

In an embodiment, the requesting/source device may include any one or more of: an IoT device, a vehicle, a sensor and a device capable of sending remote commands, e.g., a mobile (source device) requesting to open the door of a vehicle (destination/target device).

In an embodiment, the destination device may include any one or more of: an IoT device and a device capable of receiving remote commands, e.g., a vehicle, a surveillance camera, sensors etc.

In an embodiment, the base stations may include any one or more of: one or more servers capable of routing communications and at least one processor.

In an embodiment, the data may include IP data e.g., TCP data.

Figure 2B:
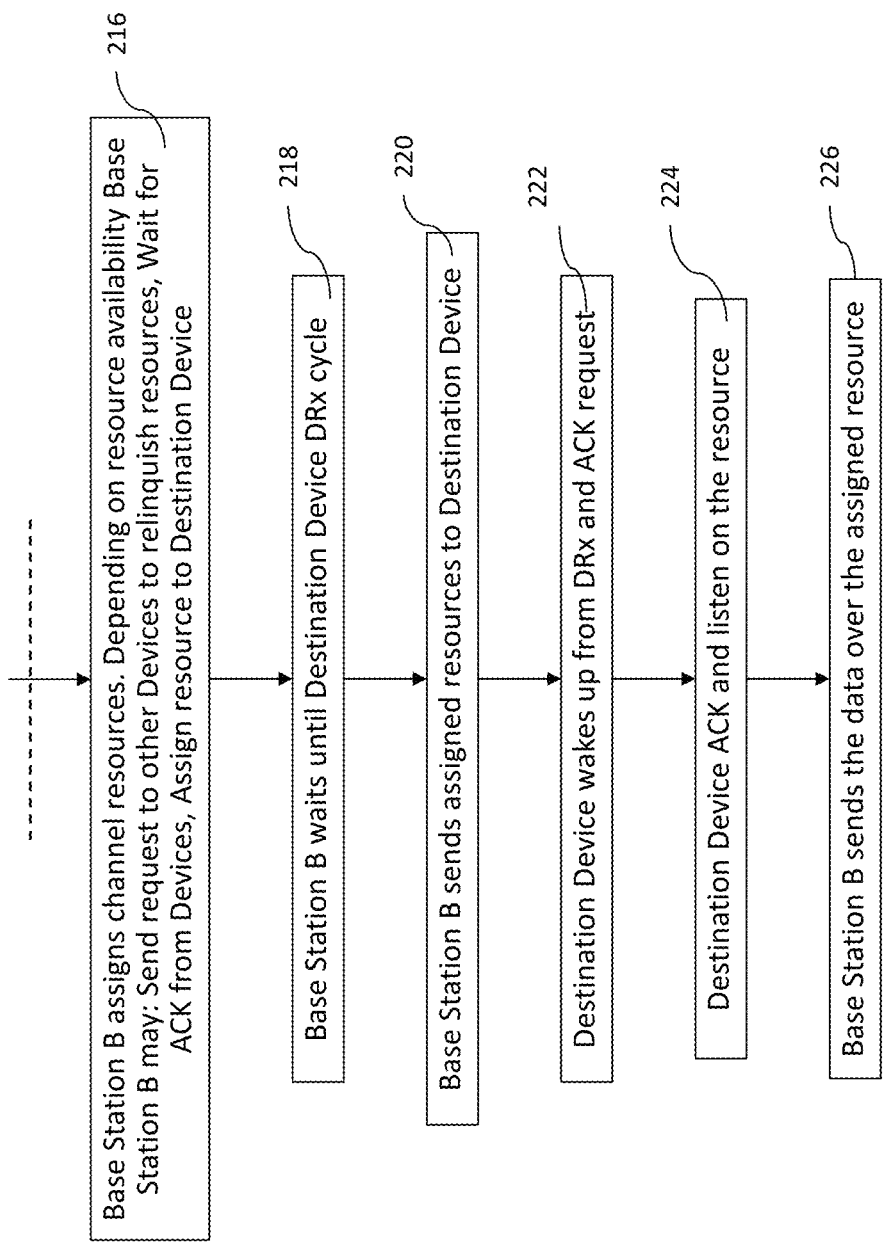

FIGS. 2A and 2B illustrate the process involved in a typical device to device data flow for IoT devices using system 100 illustrated in FIG. 1A as follows. As illustrated in FIGS. 2A and 2B, traditionally, transmission of data involves requesting a receiving device 102 to wake up from discontinuous reception (DRX) mode via step 202, requesting (transmitting) device 102 then waits for its turn to transmit data to base station A 104 via step 204. The base station A 104 then assigns channel resources for the requested transmittal of data via step 206. Depending on resource availability, base station A 104 may do any one or more of the following: send request to other devices on the network to relinquish resources, wait for acknowledgement (ACK) from devices that the resources are free/relinquished and assign resource to the requesting (transmitting) device via step 206. The base station A 104 then sends the assigned resources to the requesting device via step 208 and the requesting device sends data in one or more data segments via step 210. Network A 112 queues the data for transmission according to prioritization, e.g., TCP traffic may be lower in prioritization than other data traffic, via step 212. From Network A 112, the data is then sent to Network B 116 (which could be same as network A 112 or different from network A 112) via the IoT Cloud Service 114 via step 214. Network B 116 then queues the data for transmission according to prioritization, e.g., TCP traffic may be lower in prioritization than other data traffic via step 216. Base station B 126 assigns channel resources to the requesting device for data transmittal. Depending on resource availability base station B 126 may do any one or more of the following: send request to other devices to relinquish resources, wait for acknowledgement (ACK) from devices that the resources are free/relinquished and assign resource to destination device (receiving device) via step 216. Base Station B 126 waits until Destination Device DRx cycle via step 218. Base Station B 126 sends assigned resources to Destination Device 124 via step 220. Destination Device 124 wakes up from DRx and ACK request via step 222. Destination Device 124 ACK and listen on the resource via step 224. Base Station B 126 sends the data over the assigned resource via step 226 to the destination device 124.

FIG. 3 illustrates an exemplary method for reducing time needed to wake up a target device to receive data from a source device by informing the target device of anticipated and/or pending data transfer using system 100' illustrated in FIG. 1B and described in detail in the description accompanying FIG. 1B. The embodiments described herein overcome the time lag illustrated in FIGS. 2A and 2B and described in the description accompanying FIGS. 2A and 2B.

The embodiments described herein provide a method to reduce the time between sending data from a requesting source to a destination IoT wireless device by informing the destination device (or devices) of anticipated and/or pending data transfer. Such information can be optionally used by the destination device(s) to establish and keep data channel wireless resources assigned to it for a short period enough for the delivery of the data to be transferred in the shortest amount of time, eliminating wakeup times, resource scheduling and queuing, a technique referred to as data warmup.

The embodiments described herein provide a method to reduce the time between sending data from a requesting source to a destination IoT wireless device by one or more of the following methods: 1. a network source informing the target device of anticipated and/or pending data transfer and the target device sending a small packet of data to a base station or some destination address to keep the network connection alive and resources assigned to the target device, 2. sending a small packet of data to a base station or some destination address from a source device to keep the network connection alive and resources assigned to the source device before sending data to the network. The small packets of data may be sent by the destination device or the source device in response to a command from the network or by the devices on their own as a result of programming instructions or applications installed in the device, and the destination for the data packet may be some IP address on the internet which may or may not be a real address. The person skilled in the art may readily understand that the reduction in time lag may be achieved by either the target device (receiving device) or the source device (transmitting device) sending small packets of data thereby keeping the network connection alive and network resources assigned to the device for data transfer, or both the target device (receiving device) and the source device (transmitting device) sending small packets of data thereby keeping the network connection alive and network resources assigned to both the devices for data transfer.

In an embodiment, the data size for the small packet of data may be pre-configured by the transmitting device or alternatively provided by the warmup command. The small packet data size may vary depending on network resource requirement for the pending data transfer and can be as small as zero payload (for example a ping with zero bytes), accompanied by a data frame header (or an IP header) which may be enough for the base station to consider as data and maintain at least minimal resources. However, more frequent data transmission and/or larger data size (for example ping of 64 KB) may be configured if the application intends that the base station reserves larger number of resources for the anticipated data transfer. For example, the size of the data for a small data packet and/or frequency of sending the small data packet may be configured as parameters of the warm-up command.

An exemplary method for reducing time lag for data transfer, illustrated by FIG. 3, is performed using the exemplary system 100' illustrated by FIG. 1B and described in detail in the description accompanying FIG. 1B. In an exemplary embodiment, the transmitting and/or receiving devices continuously send a very small packet of data every few seconds and thereby maintain their data channel connection with the base station. For example, as illustrated in FIG. 3, device A (requesting/transmitting device) 102', illustrated in FIG. 1B, wants to send data to device B (receiving device) 124', illustrated in FIG. 1B, via step 302. Device A 102' sends a small packet of data at predetermined time or on command from network/server to an appropriate base station, e.g., if device A 102' belongs to network A 112', illustrated in FIG. 1B, then to a base station 104', illustrated in FIG. 1B, to which the device A 102' is assigned and which belongs to network A 112', to keep the network connection alive and resources assigned via step 304. Similarly, Device B 124' sends a small packet of data at predetermined time or on command from network/server to an appropriate base station, e.g., if device B 124' belongs to network B 116', illustrated in FIG. 1B, then to a base station 126', illustrated in FIG. 1B, to which the device B 124' is assigned and which belongs to network B 116', to keep the network connection alive and resources assigned via step 306.

Additionally or alternatively, the base station/s may notify either or both devices (requesting device and receiving device) that it will maintain the resources for a specific duration. The device may then adjust or modify the actual interval or the "predetermined time" at which the small packet of data is to be sent to compensate for this notification and the actual interval/duration to keep the resources assigned may be longer or shorter than the earlier defined duration.

The small packets of data may be sent by one or more destination devices (receiving devices) and/or one or more source devices (requesting/transmitting devices) in response to a command from the network or by the one or more devices on their own as a result of programming instructions or applications installed in the device, and the destination for the data packet may be some IP address on the internet which may or may not be a real address.

Device A 102' then sends data to device B 124' via step 308. By doing so, when a real data is to be sent or received, by those devices, such transmission and/or reception is immediate. In an embodiment, end to end (E2E) data transmission lag may be reduced by more than 300 milliseconds at each side, for example, 3-6 seconds down to less than 2 seconds, from 4-8 seconds to 3 seconds, from 1-4 seconds to 500 milliseconds etc. This may depend on the base station occupancy, e.g., how many devices are connected with that base station for sending and receiving data.

Since the devices maintain their data channel connection with the base station and since the channel resources are already assigned to the transmitting device, the time required for the process of sending data illustrated by FIGS. 2A and 2B and described in description accompanying FIGS. 2A and 2B is reduced substantially by eliminating wakeup times, resource scheduling and queuing, using a technique that may also be referred to as data warmup. The technique could be used in multiple use cases. For example:
1. Responsive mobile to vehicle commands such as Door Lock, Door Unlock, Honk, Flash and Engine Start where vehicle owners are expecting experience similar to Key Fob.
2. Vehicle to vehicle communication through a mobile network where vehicles approaching an intersection can warmup and be able to receive updates from other approaching vehicles eliminating unnecessary and dangerous data delays.

In an exemplary embodiment, the process of transmission of data from device A 102' to device B 124' may begin with the step wherein the requesting device (transmitting device) 102' sends the data in one or more data segments, network A 112' queues data for transmission based on prioritization, e.g., TCP traffic may be lower in prioritization, this data is then sent to network B 116' via the IoT cloud service 114', network B 116' then queues the data for transmission based on prioritization, e.g., TCP traffic may be lower in prioritization. Network B 116' then sends the data over already assigned resource, since the channel resources are already assigned, to the receiving device.

Similarly, In an exemplary embodiment, the process of reception of data by device B 124' from device A 102' may include the step wherein the receiving device (target device), for example, device B 124', sends the data in one or more data segments, network B 116' keeps the connection with Device A 102' on with the resources assigned to Device A 102'. Network B 116' then sends the data over already assigned resource, since the channel resources are already assigned, to the receiving device.

The small packets of data may be sent by one or more destination devices or one or more source devices as a response to the command from the network or by the one or more devices on their own, which may be based on programming instructions or applications installed in the device, and the destination for the data packet may be some IP address on the internet which may or may not be a real address. By continuously sending a very small packet of data every few seconds by the transmitting and/or receiving devices, they maintain their data channel connection with the base station. Hence, when real data is to be sent or received by those devices, such transmission and/or reception is immediate.

Figure 4A:
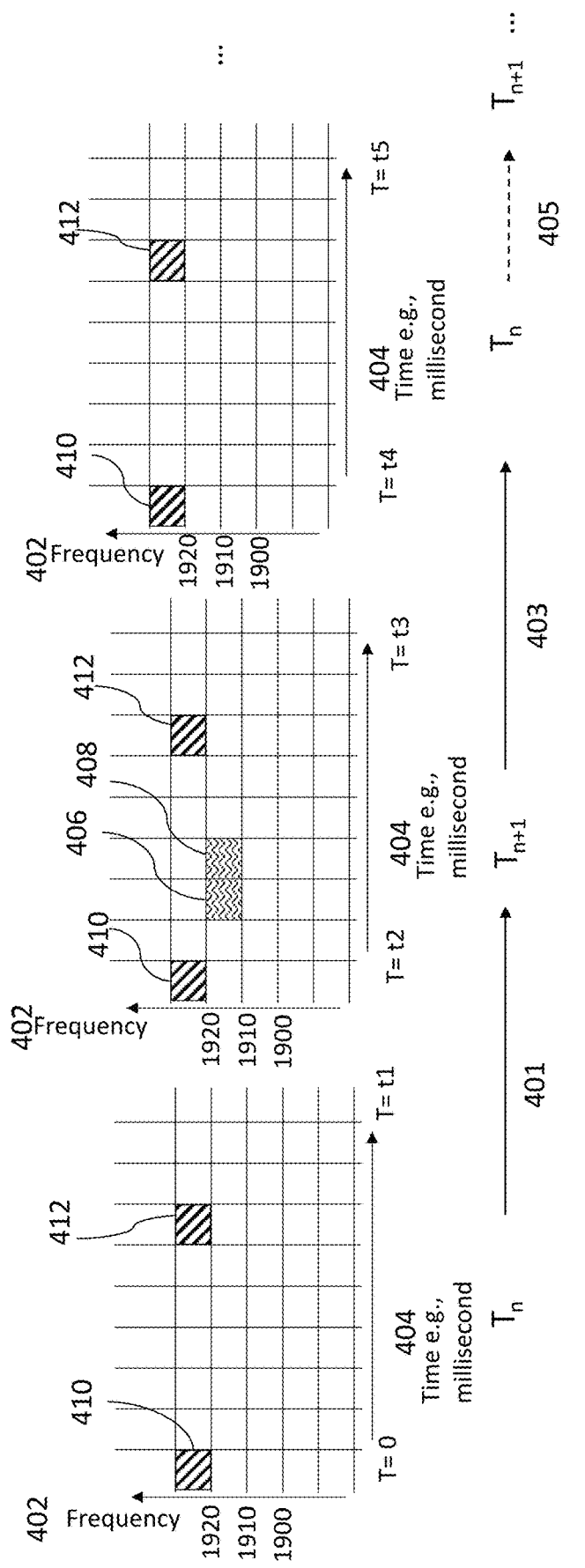
FIG. 4A illustrates a process for resource allocation in IoT device to device data transfer.

FIG. 4A illustrates an exemplary process for resource allocation in IoT device to base station data transfer, for example, corresponding to steps 206 and 216 illustrated in FIGS. 2A and 2B. As described in step 206, when a requesting device wants to send data to a destination device, it may first wait for its turn to transmit the request to send data to its assigned base station. Once the request is received by the base station, it assigns channel resources, e.g., frequency 402 and time 404, for that device to transmit data. This step is illustrated by a transition from $T_n$ to $T_{n+1}$ in FIG. 4A and may take time depending on the availability of resources consumed by other devices in the area, e.g., 0.5 seconds to 5 seconds. These resources may be allocated as a block, e.g., blocks 406, 408 etc., for a duration of time, e.g., 5 to 7 seconds also known as the idle time and at a particular frequency, e.g., 1910-1920. Depending on resource availability, e.g., if the channel resources are not readily available, the base station may proceed with sending request to other devices to relinquish resources, wait for acknowledgement (ACK) from other devices that they have relinquished the resource and/or the resource is now free to be assigned to the other devices and assign resource to the transmitting/requesting device.

Similarly, as described in step 216, when base station B receives a request that a requesting device wants to send the data to a destination device, the Base Station B assigns channel resources, e.g., frequency 402 and time 404, for that device to transmit data. This step is illustrated by a transition from $T_n$ to $T_{n+1}$ in FIG. 4A as 401 and may take time depending on the availability of resources, e.g., 0.5 seconds to 5 seconds. These resources may be allocated as a block, e.g., blocks 406, 408 etc., for a duration of time, e.g., 5 to 7 seconds also known as the idle time, and at a particular frequency, e.g., 1910-1920. Depending on resource availability, e.g., if the channel resources are not readily available, the base station may proceed with sending request to other devices to relinquish resources, wait for acknowledgement (ACK) from other devices that they have relinquished the resource and/or the resource is now free to be assigned to the other devices and assign resource to destination device. Blocks 410 and 412 represent control channels between the base station and a particular device for negotiating the data channel resources 406 and 408. For example, where the base station proceeds with sending request to other devices to relinquish resources, wait for acknowledgement (ACK) from other devices that they have relinquished the resource and/or the resource is now free to be assigned to the other devices and assign resource to the transmitting/requesting device as described above. Once a cycle of data transmission is complete and no more data is sent for a duration referred as idle time, the resources are dropped by the network for this device to accommodate data transmission cycle of the other devices, and is restarted when next data transmission request for the same device/s is received. This step is illustrated by a transition from $T_n$ to $T_{n+1}$ in FIG. 4A as 405 and may take time depending on the availability of resources, e.g., 0.5 seconds to 5 seconds. These cycles may then continue for obtaining and relinquishing network resources.

Figure 4B:
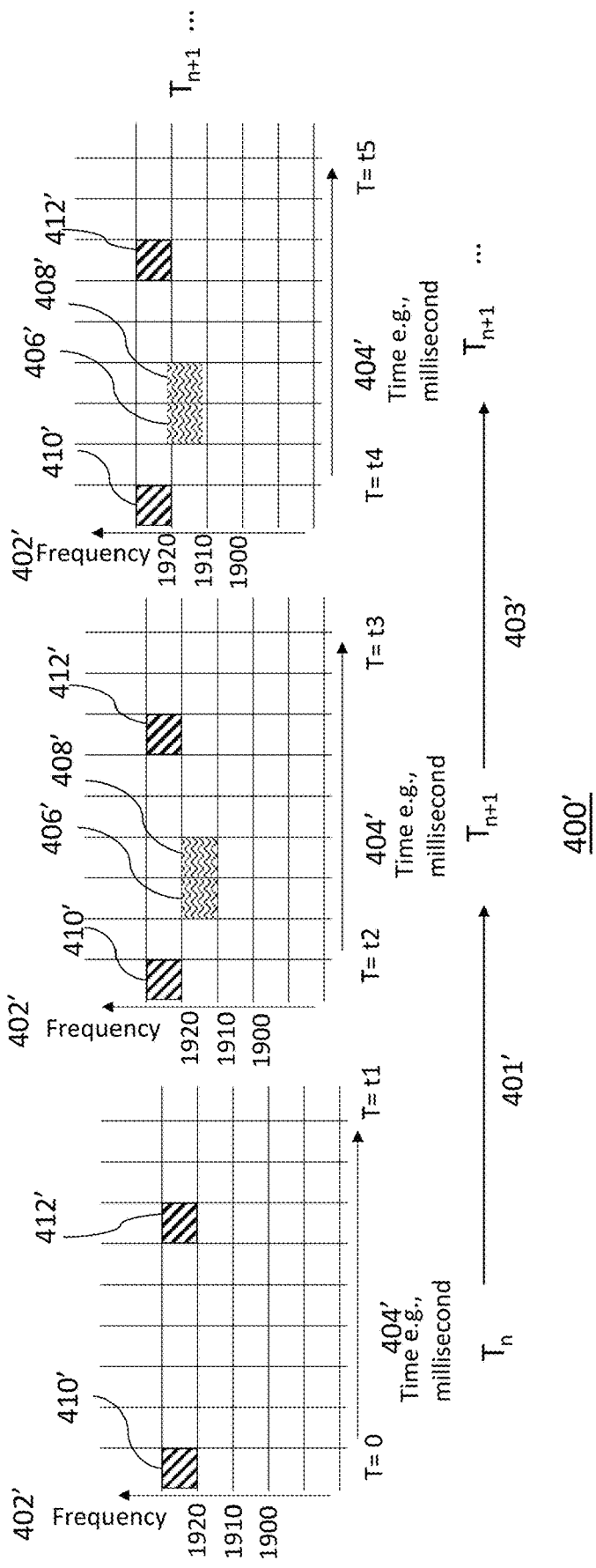
FIG. 4B illustrates a process for resource allocation in IoT device to device data transfer according to an embodiment described herein.

FIG. 4B illustrates a process for resource allocation in an IoT device to device data transfer according to an embodiment described herein. For example, when a requesting device wants to send data to a destination device, it may first wait for its turn to transmit the request to send data to its assigned base station. Once the request is received by the base station/s, it assigns channel resources, e.g., frequency 402' and time 404', for that device to transmit data and for the receiving device to receive data. This step is illustrated by a transition from $T_n$ to $T_{n+1}$ in FIG. 4B as 401' and may take time depending on the availability of resources, e.g., 0.5 seconds to 5 seconds. These resources may be allocated as a block, e.g., blocks 406', 408' etc., for a duration of time, e.g., 5 to 7 seconds also known as the idle time, and at a particular frequency, e.g., 1910-1920. Blocks 410' and 412' represent control channels between the base station and a particular device for negotiating the data channel resources 406' and 408'. In an exemplary embodiment, once this allocation of resources is performed by the respective base stations for the requesting/transmitting device and receiving/destination device, the transmitting and/or receiving devices may continuously send a very small packet of data every few seconds (less than the idle time) by informing the destination device (or devices) of anticipated and/or pending data transfer and thereby maintain their data channel connection with the respective base stations corresponding to steps 304 and 306 as illustrated in FIG. 3 and described in detail in the description accompanying FIG. 3. This step is illustrated in FIG. 4B as 401' and may results in no time lag, for example: transition from $T_{n+1}$ to next $T_{n+1}=0$, for as long as small data packets are sent to keep the resources allocated in time, for example, less than the time it takes to relinquish the resources (i.e. less than the idle time), therefore, there is no lag to acquire resources. This reduces the time lag between sending data from a requesting source/device to a destination IoT wireless device.

Additionally, such information regarding anticipated and/or pending data transfer may be used by the destination device(s) to establish and keep data channel wireless resources assigned to it for a short period enough for the delivery of the data to be transferred in the shortest amount of time, a technique which may be referred to as data warmup, eliminating wakeup times, resource scheduling and queuing.

Additionally or alternatively, the base station/s may notify either or both devices (requesting device and receiving device) that it will maintain the resources for a specific duration. The device may then adjust or modify the actual interval or the "predetermined time" at which the small packet of data is to be sent to compensate for this notification and the actual interval/duration to keep the resources assigned may be longer or shorter than the earlier defined duration thereby saving the process of sending small packets of data to maintain the resource channels allocated for the predetermined duration.

Figure 5A:
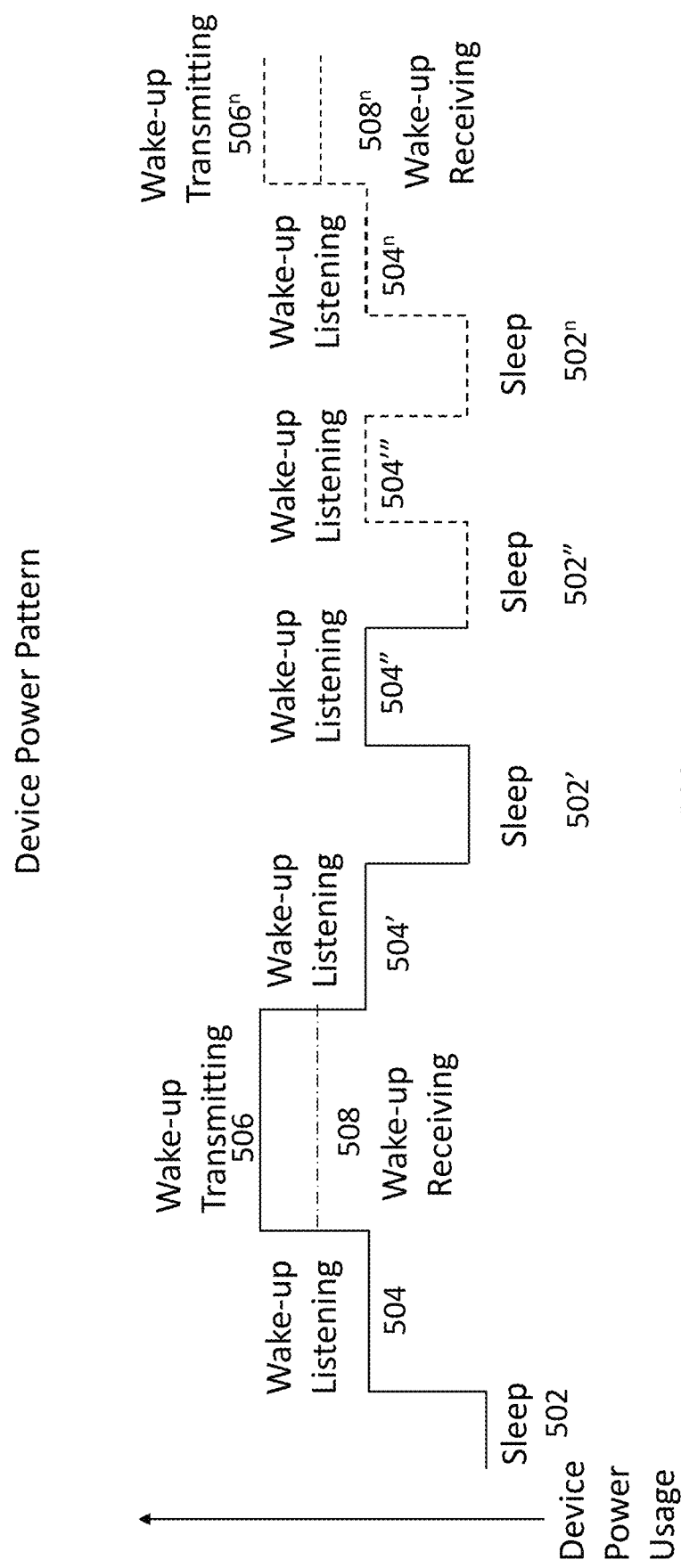
FIG. 5A illustrates device power usage pattern in IoT device to device data transfer.

FIG. 5A illustrates an exemplary device power usage pattern in IoT device to base station data transfer. Since the devices, e.g., receiving and transmitting devices, and base stations providing service to those devices may not be always connected to carry out data transfer, the base station has to manage resources among many devices it is supposed to provide services for, for example, devices in proximity of any particular base station. Additionally, the base station may also want to extend the battery life of the devices it is providing services. To achieve these goals, the base station may tear down the data channel connection to devices that aren't transmitting or receiving data at a particular point in time. The base station may also instruct the devices to sleep longer between two consecutive wakeups to check on the control channel with it (this is also called as DRx mode). When there is data to be sent or received, this data needs to wait until the device and the base station re-establish a data channel connection. This issue can be worst when the data to be exchanged is from one wireless device to another wireless device.

Generally, the way wireless communication works that there are less data channel resources than number of devices or the devices need more bandwidth depending on the type of data and quality of signal, etc. that want to use the network resources depending on the time of the day. Additionally, many of the devices are battery operated and the network would like them to conserve power so that they work for longer duration without a need for recharge. For example, more and more devices are using a lot of data for processes such as but not limited to streaming video which requires more resources per device. To achieve this, the networks connect the devices to the network in a logical fashion, where the devices listen, receive data, transmit data, as well as bidirectional data exchange that includes receiving and transmitting data. For example, as illustrated in FIG. 5A, for a device to save battery, instead having to listen continuously, the device wakes up and listens via steps 504 . . . $504^n$ e.g., for a millisecond, and goes to sleep via steps 502 . . . $502^n$, e.g., for 100 milliseconds. However, this requires the base station to know the exact time when each of the devices will wake up. Once the base station knows the exact time when a particular device wakes up, it has to queue the data to the time of the wake up and then send it while the device is in listening/receiving mode.

Figure 5B:
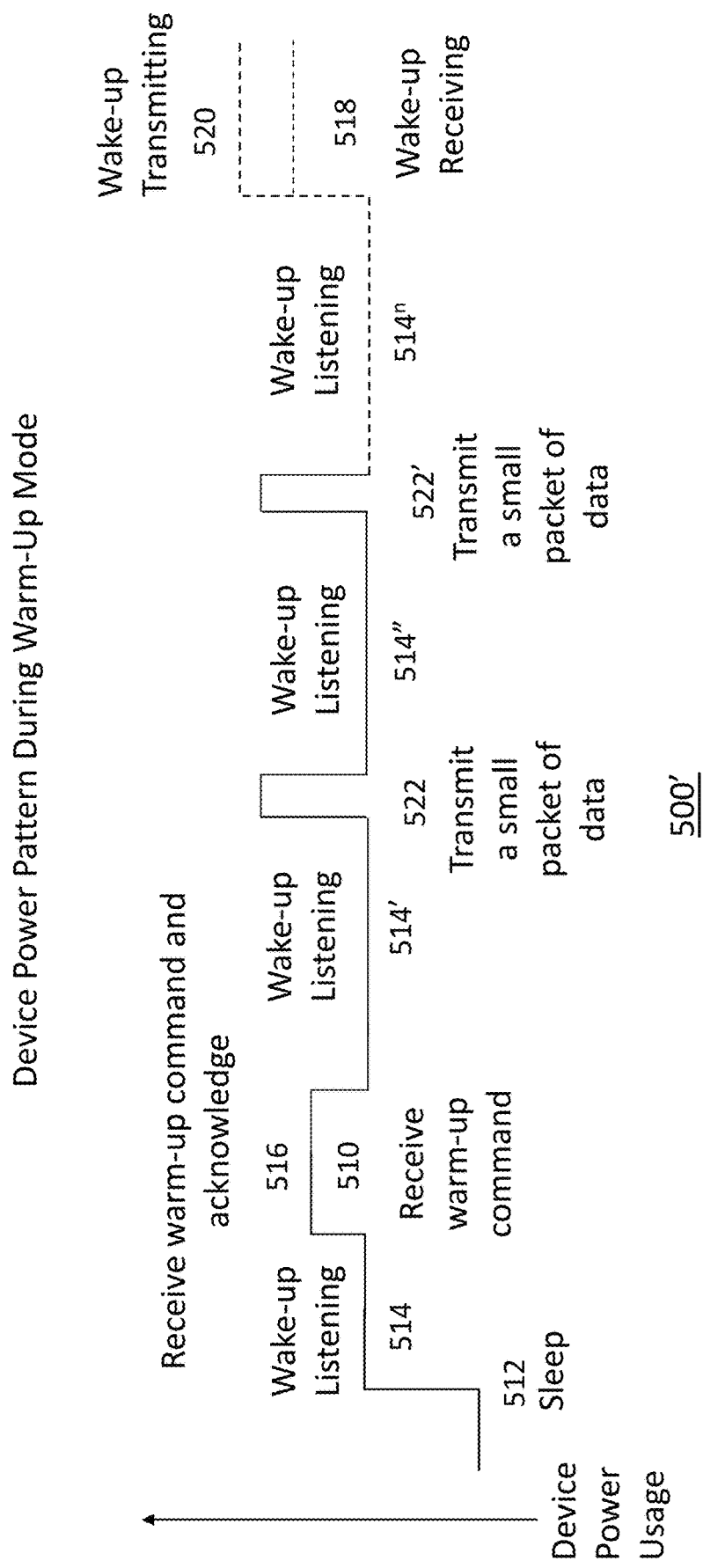
FIG. 5B illustrates device power usage pattern in IoT device to device data transfer relating to reducing time lag in data transfer according to an embodiment described herein.

FIG. 5B illustrates an exemplary device power usage pattern in IoT device to base station data transfer according to an embodiment described herein. The power management according to one or more embodiments described herein allows the device to be in sleep mode for longer thereby extending the battery life. In an embodiment, if the base station has information regarding pending data to be sent to that particular device, it sends a small packet of data 522, $522^1$, . . . $522^n$ via data channel to keep the device in "wake-up and listen" mode, so that it can continue with the wake-up mode via steps 514 . . . $514^n$, also known as "warm-up" mode and receive data.

The duration of this "warm-up" mode may be decided by the network or may be pre-configured within the application installed on the devices. Additionally or alternatively, the base station/s may notify either or both devices (requesting device and receiving device) that it will maintain the resources for a specific duration. The device may then adjust or modify the actual interval or the "predetermined time" at which the small packet of data is to be sent to compensate for this notification and the actual interval/duration to keep the resources assigned may be longer or shorter than the earlier defined duration.

For example, if a device receives an indication via 510 during the wakeup and listen cycle that there will be a data transmission, the device acknowledges the warm up command via step 516 and continues with the wake-up mode 514' . . . $514^n$ and transmits data via steps 520 . . . $520^n$ and/or receives data via steps 518 . . . $518^n$. Further continuation of the wake-up mode may be accomplished by sending small packets of data 522, $522^1$, . . . $522^n$ at a predetermined time or on command from network/server to an appropriate base station, and/or notification from the base station as described above, via data channel to keep the device in "wake-up and listen" mode, so that it can continue with the wake-up mode via steps 514 . . . $514^n$, also known as "warm-up" mode and receive data.

Alternatively or additionally, in an embodiment, the transmitting devices and/or receiving devices may continuously send a very small packet of data every few seconds to or through a base station to some destination address and thereby maintain their data channel connection with the respective base stations as illustrated in FIG. 3 and described in detail in the description accompanying FIG. 3. The small packets of data may be sent by one or more destination devices or one or more source devices as a response to the command from the network via step 510 as shown in FIG. 5B or by the one or more devices on their own, to keep base station data channel resources assigned. This may be based on programming instructions or applications installed in the device, and the destination for the data packet may be some IP address on the internet which may or may not be a real address. The warm-up command and acknowledgement of the warm-up command may be sent over a data channel between the device and the base station. By continuously sending a very small packet of data every few seconds by the transmitting and/or receiving devices, they maintain their data channel connection with the base station and the network resources assigned to them.

The duration of the warm-up may be pre-configured within the application and/or by the network. Additionally or alternatively, the base station/s may notify either or both devices (requesting device and receiving device) that it will maintain the resources for a specific duration. The device may then adjust or modify the actual interval or the "predetermined time" at which the small packet of data is to be sent to compensate for this notification and the actual interval/duration to keep the resources assigned may be longer or shorter than the earlier defined duration.

Hence, when real data is to be sent or received by those devices, such transmission and/or reception is immediate. This reduces the time lag between sending data from a requesting source/device to a destination IoT wireless device. Additionally, such information regarding anticipated and/or pending data may be used by the destination device (s) to establish and keep data channel wireless resources assigned to it for a short period enough for the delivery of the data to be transferred in the shortest amount of time, a technique which may be referred to as data warmup, eliminating wakeup times, resource scheduling and queuing.

In an embodiment, the data size for the small packet of data may be pre-configured by the transmitting device or alternatively provided by the warmup command. The small packet data size may vary depending on network resource requirement for the pending data transfer and can be as small as zero payload (for example a ping with zero bytes), accompanied by a data frame header (or an IP header) which may be enough for the base station to consider as data and maintain at least minimal resources. However, more frequent data transmission and/or larger data size (for example ping of 64 KB) may be configured if the application intends that the base station reserves larger number of resources for the anticipated data transfer. For example, the size of the data for a small data packet and/or frequency of sending the small data packet may be configured as parameters of the warm-up command.

Figure 6:
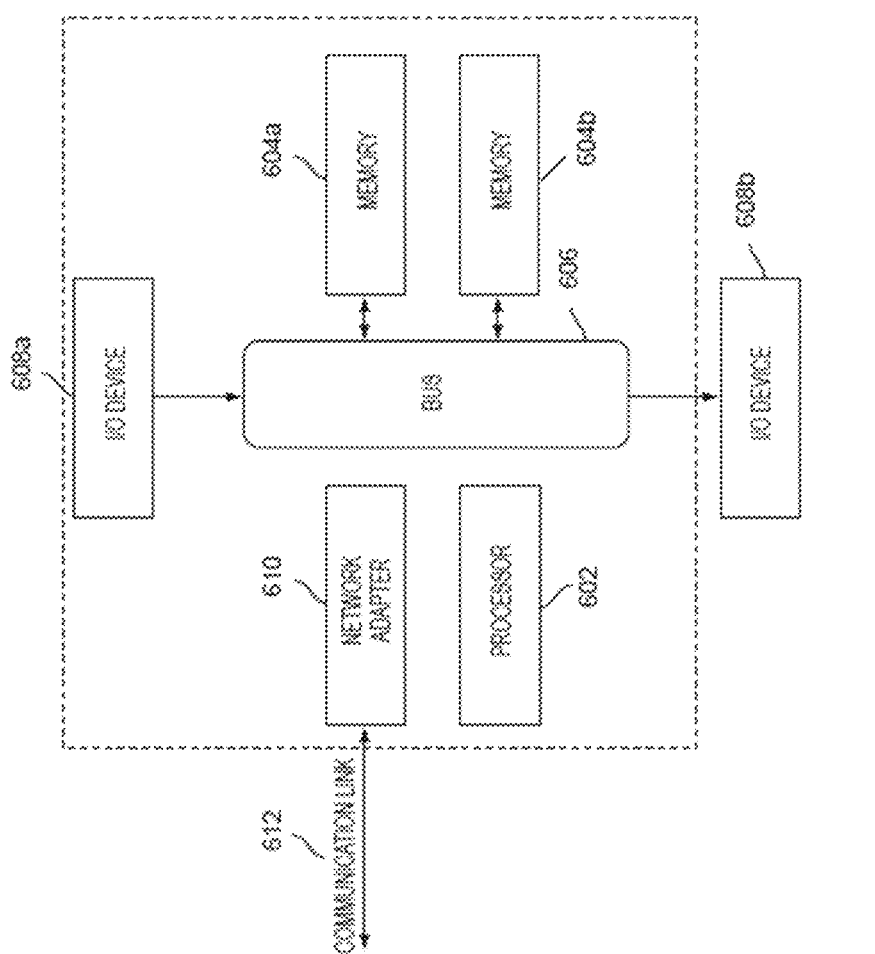
FIG. 6 illustrates a data processing system 600 suitable for storing the computer program product and/or executing program code relating to reducing time lag in data transfer in accordance with an embodiment described herein.

FIG. 6 illustrates a data processing system 600 suitable for storing the computer program product and/or executing program code in accordance with an embodiment described herein. The data processing system 600 includes a processor 602 coupled to memory elements 604a-b through a system bus 606. In other embodiments, the data processing system 600 may include more than one processor and each processor may be coupled directly or indirectly to one or more memory elements through a system bus.

Memory elements 604a-b can include local memory employed during actual execution of the program code, bulk storage, and cache memories that provide temporary storage of at least some program code in order to reduce the number of times the code must be retrieved from bulk storage during execution. As shown, input/output or I/O devices 608a-b (including, but not limited to, keyboards, displays, pointing devices, etc.) are coupled to the data processing system 600. I/O devices 608a-b may be coupled to the data processing system 600 directly or indirectly through intervening I/O controllers (not shown).

In FIG. 6, a network adapter 610 is coupled to the data processing system 602 to enable data processing system 602 to become coupled to other data processing systems or remote printers or storage devices through communication link 612. Communication link 612 can be a private or public network. Modems, cable modems, and Ethernet cards are just a few of the currently available types of network adapters.

Embodiments of the process described herein can take the form of an software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "cellular communication" is understood to include various methods of connecting any type of computing or communications devices, servers, clusters of servers, using wired and/or wireless communications networks, including cellular communication networks, to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "cellular network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for reducing time lag in data transfer between a requesting device and a destination device, the method comprising:
   sending a command from the requesting device towards the destination device;
   sending one or more packets of data from any of: the requesting device, the destination device or a combination thereof to a destination address as a result of receiving the command from the requesting device in anticipation of upcoming data transfer to keep the network connection alive and network resources assigned by wireless network between any of: the requesting device and a base station corresponding to the requesting device, the destination device and a base station corresponding to the destination device, or a combination thereof, based on any of: size of the upcoming anticipated data transfer, time of the upcoming anticipated data transfer or a combination thereof, wherein the packet of data comprises a payload including zero or more bytes accompanied by a data frame header, depending on network resource requirement for the upcoming anticipated data transfer.

2. The computer-implemented method of claim 1 further comprising, sending one or more packets of data comprising a payload including zero or more bytes by the requesting device.

3. The computer-implemented method of claim 1 further comprising, sending one or more packets of data comprising a payload including zero or more bytes by the destination device.

4. The computer-implemented method of claim 1, wherein the requesting device is a mobile device capable of sending data to the destination devices.

5. The computer-implemented method of claim 1, wherein the destination device is an IoT device capable of receiving data from the at least one requesting device.

6. The computer-implemented method of claim 1, wherein parameters of the command include size of the packet of data, time of sending the packet of data or a combination thereof.

7. A system for reducing time lag in data transfer between a requesting device and a destination device, the system comprising at least one base station; a requesting device; and a destination device;
   wherein the requesting device sends a command towards the destination device; and
   wherein any of: the requesting device, the destination device or a combination thereof, sends one or more packets of data to a destination address as a result of receiving the command from the requesting device in anticipation of upcoming data transfer to keep the network connection alive and network resources assigned by wireless network between any of: the requesting device and a base station corresponding to the requesting device, the destination device and a base station corresponding to the destination device, or a combination thereof, based on any of: size of the upcoming anticipated data transfer, time of the upcoming anticipated data transfer or a combination thereof, and
   wherein the one or more packets of data comprises a payload including zero or more bytes accompanied by a data frame header, depending on network resource requirement for the upcoming anticipated data transfer.

8. The system of claim 7, wherein the requesting device sends one or more packets of data comprising a payload including zero or more bytes.

9. The system of claim 7, wherein the destination device sends one or more packets of data comprising a payload including zero or more bytes.

10. The system of claim 7, wherein the requesting device is a mobile device capable of sending data to the destination devices.

11. The system of claim 7, wherein the destination device is an IoT device capable of receiving data from the requesting device.

12. The system of claim 7, wherein the data packet is sent as a warm-up command, and wherein parameters of the warm-up command include size of the packet of data, time of sending the packet of data or a combination thereof.

13. A computer program product stored on a non-transitory computer readable medium for reducing time lag in data transfer between a requesting device and a destination device; the computer program product comprising:
    a processor, and
    a memory in communication with the processor wherein the memory containing program instructions which when executed by the processor, perform the following operations comprising:
       sending a command from the requesting device towards the destination device;
       sending one or more packets of data from any of: the requesting device, the destination device or a combination thereof to a destination address as a result of receiving the command from the requesting device in anticipation of upcoming data transfer to keep the network connection alive and resources assigned by wireless network between any of the requesting device and a base station corresponding to the requesting device, the destination device and a base station corresponding to the destination device, or a combination thereof, based on any of: size of the upcoming anticipated data transfer, time of the upcoming anticipated data transfer or a combination thereof,
          wherein the packet of data comprises a payload including zero or more bytes accompanied by a data frame header, depending on network resource requirement for the upcoming anticipated data transfer.

14. The computer program product of claim 13 further comprising instructions for sending one or more packets of data comprising a payload including zero or more bytes by the requesting device.

15. The computer program product of claim 13 further comprising instructions for sending one or more packets of data comprising a payload including zero or more bytes by the destination device.

16. The computer program product of claim 13, wherein the requesting device is a mobile device capable of sending data to the destination devices.

17. The computer program product of claim 13, wherein the destination device is an IoT device capable of receiving data from the at least one requesting device.

18. The computer program product of claim 13, wherein the data packet is sent as a warm-up command, and wherein parameters of the warm-up command include size of the packet of data, time of sending the packet of data or a combination thereof.

19. The computer-implemented method of claim 1, wherein the wireless network includes any network managing wireless resources including cellular network, Wi-Fi or a combination thereof.

20. The system of claim 7, wherein the wireless network includes any network managing wireless resources including cellular network, Wi-Fi or a combination thereof.

21. The computer program product of claim 13, wherein the wireless network includes any network managing wireless resources including cellular network, Wi-Fi or a combination thereof.

* * * * *